Feb. 11, 1936. E. GIGER-KNÜSLI 2,030,143
VALVE
Filed Aug. 1, 1934
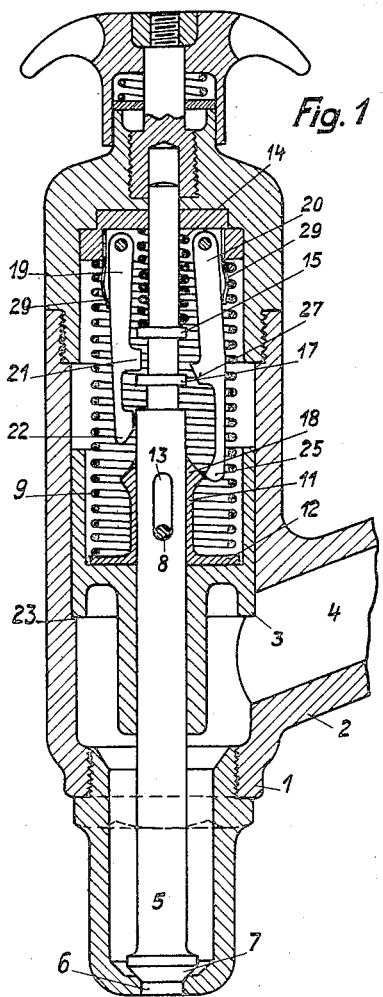
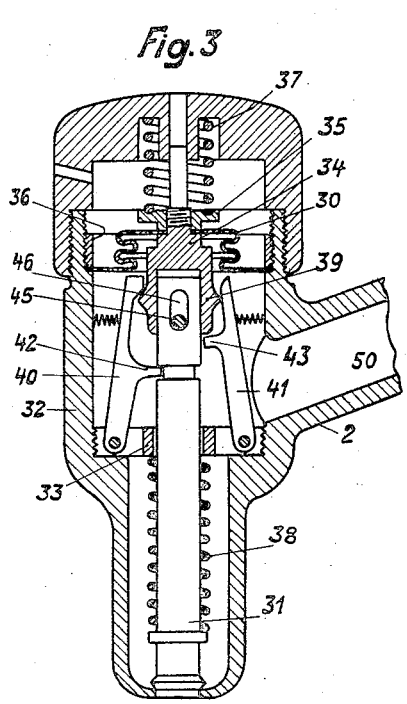
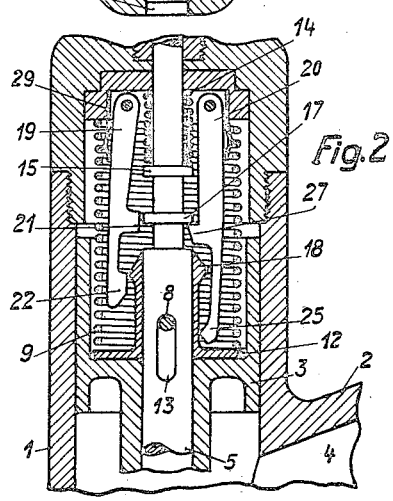
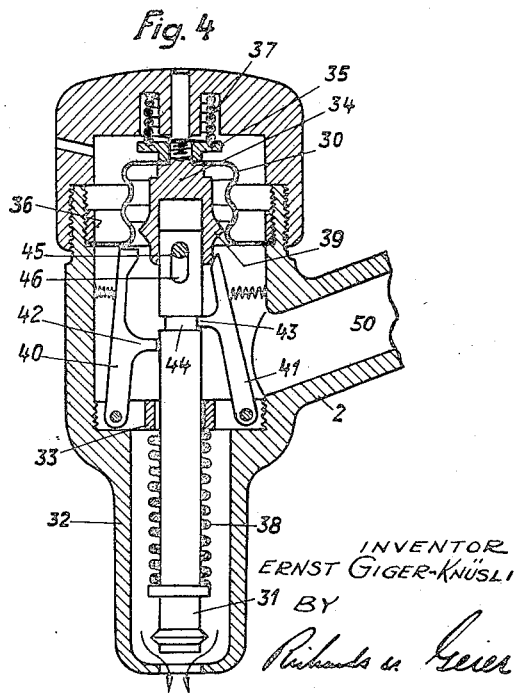
INVENTOR
ERNST GIGER-KNÜSLI
BY
ATTORNEYS Patented Feb. 11, 1936

2,030,143

UNITED STATES PATENT OFFICE 2,030,143

VALVE

Ernst Giger-Knüsli, Zurich-Hongg, Switzerland

Application August 1, 1934, Serial No. 737,879
In Germany August 16, 1933

7 Claims. (Cl. 221—84)

This invention relates to a valve adapted for connection to piping for fluid under pressure and which is opened when the pressure of fluid in the pipe reaches a predetermined value.

It is the object of the present invention to provide a valve of improved and simplified construction for this purpose.

A further object of the invention is to provide a valve of this character which can be locked in the closed and open positions.

According to the present invention the closure body of the valve is provided with a collar or with a groove and the movable element located in the fluid pipe is provided with an actuating body and in the interior of the valve casing are located two spring actuated pawls, provided with teeth, which are actuated by the actuating body when the movable element rises and falls. The teeth are so arranged on the two pawls that one pawl secures the closure body in the open position and the other pawl secures the closure body in the closed position.

In the accompanying drawing are shown by way of example two forms of construction of the invention.

Fig. 1 is a longitudinal section of the closure valve in the closed position.

Fig. 2 shows a longitudinal section of the closure valve in the open position.

Figs. 3 and 4 show a closure valve, with a diaphragm, in the closed and open position respectively.

In the valve casing 1, which is connected to an outflow pipe with a tubular member 2, is movably mounted a piston 3 which is located above the inflow point 4 of the tubular member 2. In the piston 3 is movably mounted the closure body 5 which at its lower end, located in the outflow port 6, carries a closure cone 7. The closure body 5 and the piston 3 can be moved relatively to one another. The piston 3 is subjected to the action of a spring 9 which tends to force the piston 3 downwardly against its seat 23 in the valve casing 1. In a recess of the piston 3 is movably mounted an actuating bush 11. It is held against the bottom of the piston 3 by means of the spring 9 which bears against the flange 12. A pin 8 on the bush 11 engages with an elongated slot 13 in the closure body 5, which latter is forced into the closing position by a spring 14 acting on a ring 15. The closure member 5 is provided with a second ring 17. With this ring 17 and with an actuating cam 18 on the bush 11 there co-operate two pawls 19, 20 in the following manner:—

In the closed position of the valve a tooth 21, of the pawl 19 pressed against the closure body by a spring 29, projects over the ring 17 of the closure body 5 and prevents the closure body from moving inwardly, that is to say the opening of the valve from the outside. The lower inclined end 22 of the pawl 19 projects into the path of the actuating cam 18. When as a result of an increase in the pressure of the fluid the piston 3 and therewith also the bush 11 are raised, the cam 18 moves the end 22 outwardly to such an extent that the tooth 21 is moved out of engagement with the ring 17. The closure body 5 is now free and is raised by means of the pin 8 by the upwardly moving piston 3. Fluid from the tubular member 2 can now pass through the outflow 6. The cam 18 also actuates the lower end 25 of the pawl 20, the cam 18 in the closed position of the valve holding the tooth 24 out of engagement with the ring 17. When, however, the piston 3 rises, and therewith the actuating bush 11 with the cam 18, against the action of the spring 9, the pawl 20 is forced inwardly by the action of its spring 29. When the closure body reaches its upper end position, that is to say its open position, the tooth 27 engages under the ring 17. The closure body 5 is thus locked in its open position and remains locked until the piston 3 is again moved downwardly by the expanding spring 9. With the piston 3 there also moves downwardly the actuating bush 11. The actuating cam 18 moves the lower end 25 of the pawl 20 outwardly and thus moves the tooth 27 from its locking position. The closure body 5 returns to its closed position. The pawl 19 then also returns to its locking position so that the closure body 5 is now again locked.

In Figs. 3 and 4 is shown a second form of construction wherein the piston is replaced by a diaphragm or resilient metal bellows 30. The closure body 31 is guided in a bush 34 to which latter the bellows 30 are secured by a nut 35. The bellows are secured in the valve casing 32 by a ring 36. Between a closure cap and the nut 35 is located a spiral spring 37. On the closure body 31 there acts a spring 38. The bush 34 is provided at its periphery with an annular cam 39 by which there are actuated two locking pawls 40, 41. The latter are pivotally mounted on the guide 33 and can engage by means of teeth 42, 43 with an annular groove 44 of the valve body 31. To the bush 34 is secured a pin 45 which engages with an elongated slot 46 of the closure body 31.

The method of operation of this valve is as follows:—

The spring 38 tends to force the closure body 31 against its seat. The bellows 30 are held in the lower end position (Fig. 3) by the spring 37. The tooth 42 of the pawl 40 engages with the annular groove 44 and holds the closure body 31 in the closed position. If now an increase in pressure occurs in the supply pipe 50 and thus in the interior of the valve casing 32, the bellows 30 are moved against the action of the spring 37. The bush 34 is thus raised and by means of the annular cam 39 moves the pawl 40 outwardly. The tooth 42 is thus disengaged from the annular groove 44. The closure body 31 can now be moved upwardly against the action of the spring 38 into the open position. When the body 31 has reached the upper end position the tooth 43 of the pawl 41 comes into engagement with the annular groove 44. The closure body 31 is thus locked in the open position. Springs may be provided which press the pawls 40, 41 against the bush. The elongated slot 46 enables the bush 34 to move on the closure body through a predetermined opening movement of the closure body 31.

Fig. 4 shows the various parts in the open position of the valve.

What I claim is:

1. A valve for the purpose specified comprising a valve casing, a valve body in said casing, a pressure actuated element movably mounted in said casing, a cam member carried by said element, a spring operatively associated with said valve body, said spring normally tending to hold said body in its closed position, a second spring operatively associated with said pressure actuated element, two spring-actuated pawls pivotally mounted in said casing, said pawls co-operating with said cam member, teeth on said pawls, said teeth relatively spaced on said pawls, and means on said valve body for co-operation with said teeth, the arrangement being such that in one end position of the valve body the co-operating means thereon are engaged by the tooth of one of the pawls, whilst in the other end position of the valve body the co-operating means thereon are engaged by the tooth of the other pawl.

2. A valve according to claim 1, wherein the pawls are of different length whereby, when actuated by said cam member, the tooth of one pawl is disengaged from the co-operating means of the valve body and when the valve body has reached the end of its travel, the tooth on the other pawl engages with said co-operating means to lock the valve in the open position and to lock it in its closed position when the movement is reversed.

3. A valve according to claim 1, wherein the cam member is slidably mounted on said valve body, said valve body having an alongated slot therein, and a pin in said cam member, said pin engaging said elongated slot so as to form a lost motion connection.

4. A valve for the purpose specified comprising a valve casing, a valve body in said casing, a spring operatively mounted between said valve casing and said valve body, said spring normally holding said valve body in its closed position, a piston slidably mounted on said valve body, said piston being subjected to the pressure of fluid prevailing in said casing, a cam member carried by said piston, a spring located between said casing and said piston and cam member, said spring normally urging said piston and said cam member against the fluid pressure, a pair of pawls of unequal length pivoted in said casing, said pawls co-operating with said cam member, two teeth provided one on each of said pawls, said teeth being relatively spaced on said pawls, and a collar on said valve body, said collar being adapted in one position to be engaged by the tooth of one pawl in one position to lock the valve body in the closed position and by the tooth of the other pawl in another position for locking the valve body in the open position.

5. A valve for the purpose specified comprising a valve casing, a valve body in said casing, a spring operatively mounted between said valve casing and said valve body, said spring normally holding said valve body in its closed position, an expansible diaphragm in said casing, a cam member carried by said diaphragm, a spring between said diaphragm and said casing, said spring being adapted to urge said diaphragm against fluid pressure prevailing in said casing, a pair of pawls of unequal length pivoted in said casing, said pawls co-operating with said cam member, two teeth provided, one on each of said pawls, said teeth being relatively spaced on said pawls, said valve body having an annular groove therein, said groove being adapted in one position to be engaged by the tooth of one pawl for locking the valve body in the closed position and by the tooth of the other pawl in another position for locking the valve body in the open position.

6. A valve for supplying fluid under pressure comprising a valve casing having an inlet duct and a discharge spout, a pressure actuated element movably mounted in said casing, a valve body adapted to open and close said spout extending through said pressure actuated element and movable to a limited extent therein, means in said casing for normally holding said valve body in closed position, and individual means tending to move said pressure actuated element towards said spout and locking means adapted to be connected to said valve body for locking said valve body in open and closed positions, respectively.

7. A valve for supplying fluid under pressure comprising a valve casing having an inlet duct and a discharge spout, a pressure actuated element movably mounted in said casing, a valve body adapted to open and close said spout extending through said pressure actuated element and movable to a limited extent therein, means in said casing for normally holding said valve body in closed position, and individual means tending to move said pressure actuated element towards said spout, a pair of relatively spaced pawls, a cam member carried by said pressure actuated element for relatively spreading said pawls and means on said valve body co-operating with said pawls for locking said valve body in open and closed positions, respectively.

E. GIGER-KNÜSLI.